United States Patent
Cloonan et al.

(10) Patent No.: US 9,736,511 B2
(45) Date of Patent: Aug. 15, 2017

(54) GATEWAY FOR TRANSLATING SIGNALS BETWEEN A LEGACY FREQUENCY SPLIT IN A HOME NETWORK AND A HIGH FREQUENCY SPLIT IN A COMMUNICATIONS NETWORK

(71) Applicant: ARRIS Enterprises, Inc., Suwanee, GA (US)

(72) Inventors: Thomas J. Cloonan, Lisle, IL (US); Carol J. Ansley, Johns Creek, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 14/677,472

(22) Filed: Apr. 2, 2015

(65) Prior Publication Data
US 2016/0295251 A1    Oct. 6, 2016

(51) Int. Cl.
*H04N 21/85*    (2011.01)
*H04N 21/2383*    (2011.01)
*H04N 21/61*    (2011.01)

(52) U.S. Cl.
CPC ....... *H04N 21/2383* (2013.01); *H04N 21/615* (2013.01)

(58) Field of Classification Search
CPC ..................................................... H04N 21/85
USPC ........................................................... 725/116
See application file for complete search history.

(56) References Cited

U.S. PATENT DOCUMENTS

2011/0255452 A1    10/2011    Brooks
2013/0276047 A1*   10/2013    Chapman ......... H04N 21/42676
                                                          725/111

* cited by examiner

*Primary Examiner* — Hunter B Lonsberry
(74) *Attorney, Agent, or Firm* — Lori Anne D. Swanson

(57) ABSTRACT

Particular embodiments use a network device, such as a gateway, as an interface between a first network, such as a hybrid fiber coax (HFC) network, and a second network, such as a home network. The first network includes a frequency spectrum that may be considered "high split", and the second network has a frequency split that is used by legacy set-top box boxes. A head-end sends a network downstream signal that includes the out of band downstream signal in the downstream frequency band using the HFC network's frequency split. The out of band downstream signal may be represented by digital data. The gateway can then determine samples from the digital data, which are then used to reproduce the out of band downstream signal at the desired frequency for the home network. That is, the out of band downstream signal may be recreated in the frequency range of 70-130 MHz.

17 Claims, 4 Drawing Sheets

GATEWAY FOR TRANSLATING SIGNALS BETWEEN A LEGACY FREQUENCY SPLIT IN A HOME NETWORK AND A HIGH FREQUENCY SPLIT IN A COMMUNICATIONS NETWORK

BACKGROUND

As the cable television (CATV) infrastructure evolves, the upper boundary of the return band frequency in a CATV system may be extended by increasing the frequency of the split between the return band (e.g., upstream channel) and the forward band (e.g., downstream channel); this allocates more bandwidth to the upstream channel. The return band is dedicated to the transport of signals from customer premise equipment (e.g., set-top boxes or other components) to the CATV head-end, and the forward band is dedicated to the transport of signals from the CATV head-end to the customer premise equipment. Extending the return band will enable more upstream bandwidth capacity due to the increased upstream spectrum. However, reallocating spectrum to the upstream consumes a portion of the spectrum previously dedicated to the downstream path. Thus, increasing the upper boundary of the return band frequency may interfere with CATV components that require downstream communication signals that fall within the frequency reallocated to the return band. One subset of these downstream communication signals are generally referred to as out of band signaling. In this case, many legacy components dependent on downstream communication signals in the reallocated band would become inoperative and could require replacement, resulting in a large expense for system operators.

In an example DOCSIS implementation described for purposes of illustration, consider implementations in which the return band is extended from 42 MHz or 65 MHz to approximately 200 MHz (called high-split), or higher. There may be a significant population of devices, such as legacy set top boxes, that require forward path out of band (OOB) communication signals in the forward path below 200 MHz, which is a portion of the spectrum that is now reallocated to the return band. The OOB communication signals may be control signals or other information that the head-end sends to the set top boxes. Thus, increasing the upper boundary of the return band frequency to 200 MHz may interfere with the legacy set top boxes that receive downstream communication signals below 200 MHz. Typically, these set top boxes cannot be re-tuned to receive out of band signals at the higher frequencies required. For example, the receivers for the out of band signals for a legacy set top box are normally tuned to 70-130 MHz, and typically the legacy downstream out of band STB control channel is located at 75 MHz. Thus, if the upstream frequency band on the upstream cable plant is extended, the legacy set top box out of band receivers will no longer receive their required signals. That is, the legacy downstream out of band control channel is cut off by the high-split upstream frequency band. The continuing need for out of band communications below 200 MHz represents a barrier to expanding DOCSIS bandwidth and may deter further use of a DOCSIS compliant system. Replacing all legacy set top boxes prior to a migration to an advanced DOCSIS system may be logistically (and financially) undesirable.

DETAILED DESCRIPTION

Figure 1:
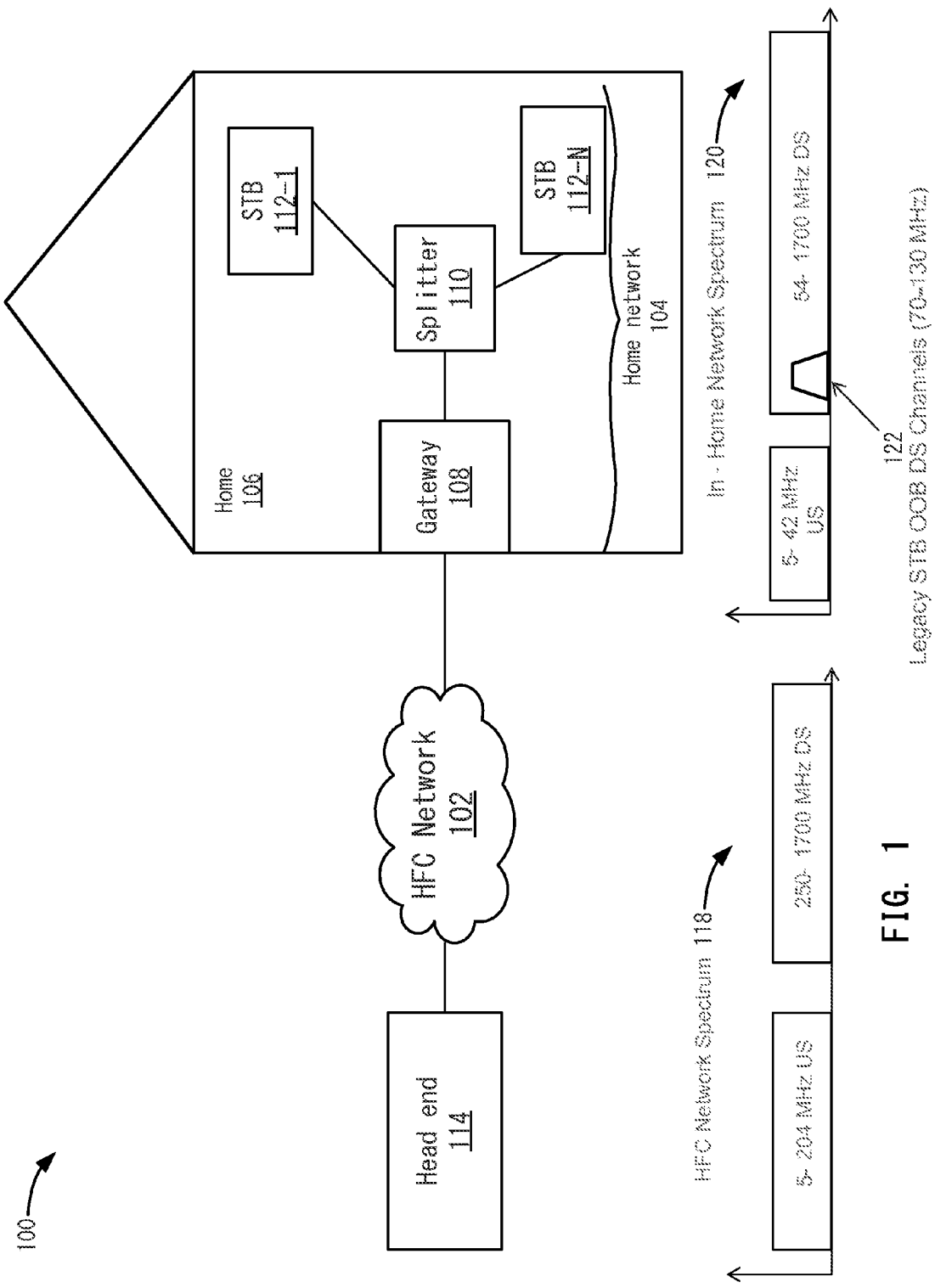
FIG. 1 depicts a simplified system for processing out of band signals according to one embodiment.

Described herein are techniques for a gateway to facilitate out of band signaling between networks using different frequency splits. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments use a network device, such as a gateway, as an interface between a first network, such as a hybrid fiber coax (HFC) network, and a second network, such as a home network. The first network includes a frequency spectrum that may be considered "high split", such as having upstream spectra of 5-204 MHz and downstream spectra of 250-1700 MHz. The second network has a frequency split that is used by legacy set-top box boxes. This spectrum includes upstream spectra of 5-42 MHz and downstream spectra of 54-1700 MHz. As discussed above, variations on the frequency splits may be appreciated.

Data over cable service interface specification (DOCSIS) is a standard that permits the addition of high bandwidth data over a cable TV system. Multi-service operators (MSOs) can use DOCSIS to offer high-speed data Internet service to subscribers over an HFC network. DOCSIS may use quadrature amplitude modulation (QAM) signaling in the downstream and upstream directions to communicate IP packets between a head-end and gateway. The QAM channels use Reed-Solomon forward error correction (FEC) for error correction. The previous versions of DOCSIS used the upstream spectrum range of 5-42 MHz and a downstream spectrum of 54-1002 MHz. An optional upstream bandwidth setting for 5-85 MHz, with the appropriate downstream settings, was available in DOCSIS 3.0, but it was not deployed by any operators.

However, the DOCSIS 3.1 specification permits the use of orthogonal frequency division multiplex (OFDM) channels instead of QAM channels. The DOCSIS 3.1 OFDM channels also permit the use of low density parity check (LDPC) error correction techniques. Further, DOCSIS 3.1 permits MSOs to change the bandwidth on their channels such that the upstream spectra bandwidth can range from 5-204 MHz and the corresponding downstream spectra can range from 250-1700 MHz. This allows much larger spectral regions to be supported and permits larger bandwidth capacities for both the upstream and downstream directions between the head-end and gateway. These advantages are providing incentive to MSOs to more seriously consider upstream upgrades than with DOCSIS 3.0.

Legacy set-top boxes use proprietary signaling protocols to transmit information from a head-end to set-top boxes in a home. The proprietary signaling protocols are known as out of band downstream signals or OOB downstream signals because the OOB downstream signals do not carry information within the normal quadrature amplitude (QAM)

channels that deliver compressed and encoded video content to set-top boxes. Instead, this information is carried in a separate downstream channel. In one embodiment, the OOB downstream signals are Society of Cable Telecommunications Engineers (SCTE) 55 OOB signals. SCTE 55 defines standards for sending OOB signals.

Different messaging protocols may be used to communicate the out of band downstream signals. The out of band downstream signals may include information such as localized data unique to each user of set-top boxes, video control/enabling data delivery information, set-top box code upgrades, two-way interactive application messaging (e.g., ordering a video on-demand (VoD) video), and emergency alert system (EAS) notifications. Legacy set-top boxes that are already deployed require the use of the proprietary messaging protocols to provide the above non-program stream information from head-end to set-top box in the downstream frequency range that is now allocated to the upstream direction in DOCSIS 3.1.

The messaging protocols may use different methods to send data across the HFC network. For example, Internet protocol (IP) packets may be sent where the packets are encoded using differential quadrature phase-shift keying (DQPSK) modulation. Another protocol may use a reservation request/reservation grant to schedule transmissions of asynchronous transfer mode (ATM) cells. The ATM cells may be encoded on the coaxial network of the HFC network using DQPSK modulation.

The out of band DQPSK channels use downstream transmission within the 70-130 MHz range and use upstream transmissions within the 5-42 MHz range for the legacy set-top boxes. As discussed above, legacy set-top boxes cannot be easily reprogrammed to receive out of band downstream signals in a different frequency range. Particular embodiments provide a method for enabling the continuing use of the already deployed legacy set-top boxes without forcing MSOs to retire and replace those legacy set-top boxes with new set-top boxes that do not have a fixed frequency limitation for receiving the OOB downstream signals.

In particular embodiments, a head-end wants to send an out of band signal to set top boxes that are located in the home network. The head-end sends a network downstream signal that includes a digital version of the out of band downstream signal in the downstream frequency band using the HFC network's frequency split. The digital version of the out of band downstream signal may be represented in several ways, including but not limited to:

a) transporting the raw, unmodulated, un-coded bit streams representing the out of band downstream data directly to the gateway encapsulated inside of one or more layers of Ethernet or Internet Protocol or other tunneling packet technology protocols other than the legacy modulation protocols normally used to transmit the out of band signals directly to the set-top boxes in the 70-130 MHz range, by utilizing DOCSIS, DSL, VDSL, PON, or other broadband data transport technology.

b) transporting digital samples (obtained via analog to digital conversion techniques) of the analog signals which are the broadband radio frequency (RF)-modulated and coded versions of the out of band downstream signals based on the legacy RF modulation protocols normally used to transmit the out of band signals directly to the set-top boxes, whereby these digital samples are sent directly to the gateway encapsulated inside of one or more layers of Ethernet or Internet Protocol or other tunneling packet technology protocols other than the legacy modulation protocols normally used to transmit the out of band signals directly to the set-top boxes in the 70-130 MHz range, by utilizing DOCSIS, DSL, VDSL, PON, or other broadband data transport technology c) transporting digital samples (obtained via analog to digital conversion techniques) of the baseband analog signals resulting from the frequency down conversion of the broadband RF-modulated and coded versions of the out of band downstream signals based on the legacy RF modulation protocols normally used to transmit the out of band signals directly to the set-top boxes in the 70-130 MHz range, whereby these digital samples are sent directly to the gateway encapsulated inside of one or more layers of Ethernet or Internet Protocol or other tunneling packet technology protocols other than the legacy modulation protocols normally used to transmit the out of band signals directly to the set-top boxes, by utilizing DOCSIS, DSL, VDSL. PON, or other broadband data transport technology d) transporting digital I and Q samples (obtained via analog to digital conversion techniques) of the baseband analytical signals resulting from the quadrature down conversion (using a complex-valued exponential) of the broadband RF-modulated and coded versions of the out of band downstream signals based on the legacy RF modulation protocols normally used to transmit the out of band signals directly to the set-top boxes in the 70-130 MHz range, whereby these digital I and Q samples are sent directly to the gateway encapsulated inside of one or more layers of Ethernet or Internet Protocol or other tunneling packet technology protocols other than the legacy modulation protocols normally used to transmit the out of band signals directly to the set-top boxes in the 70-130 MHz range, by utilizing DOCSIS, DSL, VDSL, PON, or other broadband data transport technology. Also, narrowband digital forward (NDF) sampling may be used to transport NDF samples in a similar manner.

The gateway receives the network downstream signal and can then produce the desired broadband RF-modulated and coded version of the out of band downstream signals based on the legacy RF modulation protocols normally used to transmit the out of band signals directly to the set-top boxes in the 70-130 MHz range. If raw, unmodulated, un-coded bit streams representing the out of band downstream signals were delivered to the gateway (as described in (a) above), then the gateway can perform the appropriate modulation and coding operations and perform digital to analog conversion operations to create the desired broadband RF-modulated and coded version of the out of band signal at the desired frequency for the home network. If digital samples or I and Q digital samples representing the out of band downstream signals were delivered to the gateway (as described in (b) and (c) and (d) above), then the gateway can extract those samples and perform any appropriate frequency upconversion operations and perform digital to analog conversion operations to create the desired broadband RF-modulated and coded version of the out of band signal at the desired frequency for the home network. That is, the out of band downstream signal may be recreated in the frequency range of 70-130 MHz, which is within the frequencies legacy set-top boxes can receive out of band signaling in the downstream direction.

FIG. 1 depicts a simplified system 100 for processing out of band signals according to one embodiment. System 100 includes a first network 102 and a second network 104. First network 102 may be referred to as a hybrid fiber coax (HFC) network for discussion purposes. HFC network 102 may be part of a cable television (CATV) network that is generally known. However, other types of networks may be appreciated. These may include other networks that can use the frequency split for the HFC network as will be described below. Also, second network 104 may be referred to as a home network, but other networks may also be appreciated. Home network 104 is different from HFC network 102. For example, home network 104 may be located in a location, which will be referred to as home 106.

Home network 104 may include a gateway 108, a splitter 110, and set-top boxes 112-1-112-n. Gateway 108 serves as an interface between HFC network 102 and home network 104. As will be described in more detail below, gateway 108 performs functions that allow home network 104 to operate using different frequency splits from HFC network 102. Although gateway 108 is described, it is possible that the functions described with respect to the gateway may be performed in a device separate from the gateway.

In home network 104, a splitter 110 may split a signal, and send the signal to set-top boxes 112-1-112-n. Set-top boxes 112 may be user devices or customer premise equipment that can receive signals and display information on other user devices such as televisions. In one embodiment, set top boxes 112 may include "legacy" set top boxes, which are tuned to receive out of band downstream signals between 70-130 MHz, and cannot be re-tuned to receive out of band downstream signals at higher frequencies.

HFC network 102 includes a head-end 114 that can provide video, data, and voice services to home network 104. For example, HFC network 102 transports video, data, and voice signals to STBs 112. HFC network 102 includes a first frequency split that may be considered high split in that the upstream spectrum has been increased with respect to the upstream frequency used by legacy set-top box devices. As shown at 118, the upstream frequency band is allocated between 5-204 MHz and the downstream frequency band is from 250-1700 MHz. It will be understood that these frequencies may differ slightly. As shown at 120, the in-home network frequency split has an upstream frequency band of 5-42 MHz and a downstream frequency band of 54-1700 MHz. It will be understood that these frequencies may also differ slightly, such as the upstream frequency band may be from 5-65 MHz and the downstream frequency band may be from 80-1700 MHz. As shown at 122, the legacy set-top box out of band (STB OOB) downstream channel typically falls between 70-130 MHz. Given the shift to the high-split frequency spectrum, the legacy STB OOB downstream channel now falls within the upstream channel in the HFC network spectrum.

Particular embodiments do not change the in-home network frequency split to conform with the HFC network frequency split. This allows legacy set-top boxes 112 to continue to operate within their set configuration, which receives out of band downstream signals within the 70-130 MHz channel and cannot be re-tuned to receive OOB downstream signals in other frequencies. However, to conform with the high-split architecture of HFC network 102, head-end 114 may send network downstream signals in the 250-1700 MHz downstream frequency band through HFC network 102 to gateway 108. Gateway 108 is then configured to retrieve the out of band downstream signal from the network downstream signal, and provide the out of band signal to set-top boxes 112 within the legacy STB OOB downstream channel frequency. Particular embodiments may use different methods for delivering the out of band downstream signal within the network downstream signal from head-end 114. As will be discussed in more detail below, the out of band downstream signal may be delivered via digital data from head-end 114 through HFC network 102. Gateway 108 may then use the digital data to place the out of band downstream signal in the desired downstream channel of 70-130 MHz in home network 104.

It should be understood that for all embodiments of the proposed instantiations, the transport of the out of band signals between the head-end and the gateway is accomplished by transmitting a digital version of the out of band downstream signal. This digital version is quite different from the actual analog version of the out of band downstream signal, even though both versions transmit the same desired out of band information. The analog version is an actual RF-modulated signal based on amplitude modulation and/or phase modulation and/or frequency modulation of a carrier waveform, where the modulation levels are determined by groupings of bits within the out of band information stream that is being transmitted. The analog version would have to be positioned within the spectrum at the frequency required by the set-top box, and this frequency location for the analog version will not typically be available once the DOCSIS 3.1 return band has been extended to cover a higher frequency range. Thus, the information needs to be transmitted from head-end 114 to gateway 108 in a different (higher) portion of the spectrum that is permitted by the forward band of in-home network spectrum 120, such as the DOCSIS 3.1 forward band. It is possible to use simple frequency up-conversion techniques in the head-end that would permit the analog version of the out of band downstream signal to be transmitted from the head-end to the gateway followed by a coordinated frequency down-conversion in the gateway, but the plans for the use of analog transmission between the head-end and homes are beginning to be phased out. CATV operators are starting to plan for a future where the entire forward band may be carrying digital signals, such as DOCSIS 3.1 signals. Thus, the transport of the out of band downstream signals between the head-end and the gateway is better served by converting the out of band downstream signal into a digital version that can be transported by DOCSIS or by other broadband access technologies. As described earlier, many different techniques can be utilized to convert the out of band downstream signal into a digital version. These techniques include:

a) the use of the raw, unmodulated, un-coded bit streams representing the out of band downstream signal, b) the use of digital samples (obtained via analog to digital conversion techniques) of the analog signals which are the broadband RF-modulated and coded versions of the out of band downstream signal, c) the use of digital samples (obtained via analog to digital conversion techniques) of the baseband analog signals resulting from the frequency down conversion of the broadband RF-modulated and coded versions of the out of band downstream signal, d) the use of digital I and Q samples (obtained via analog to digital conversion techniques) of the baseband analytical signals resulting from the quadrature down conversion (using a complex-valued exponential) of the broadband RF-modulated and coded versions of the out of band downstream signal. These methods will now be described in more detail.

In one embodiment, digital data for the out of band downstream signal may be transported in an uncompressed or compressed format. The digital data in this embodiment may be samples that are created from sampling of the analog version of the out of band downstream signal. Gateway 108 may receive the digital data, determine the samples from the digital data, and recreate the out of band downstream signal.

The out of band downstream signal is then sent to set-top boxes 112 in the downstream spectrum over in-home network 104.

In another embodiment, raw digital data may be sent to gateway 108. This digital data may not have been modulated into an analog version of the broadband RF-modulated and coded out of band downstream signal. In this case, gateway 108 determines the raw digital data from the network downstream signal, and can then modulate the data to create digital samples that can be converted into the analog version of the broadband RF-modulated and coded out of band downstream signal.

Figure 2:
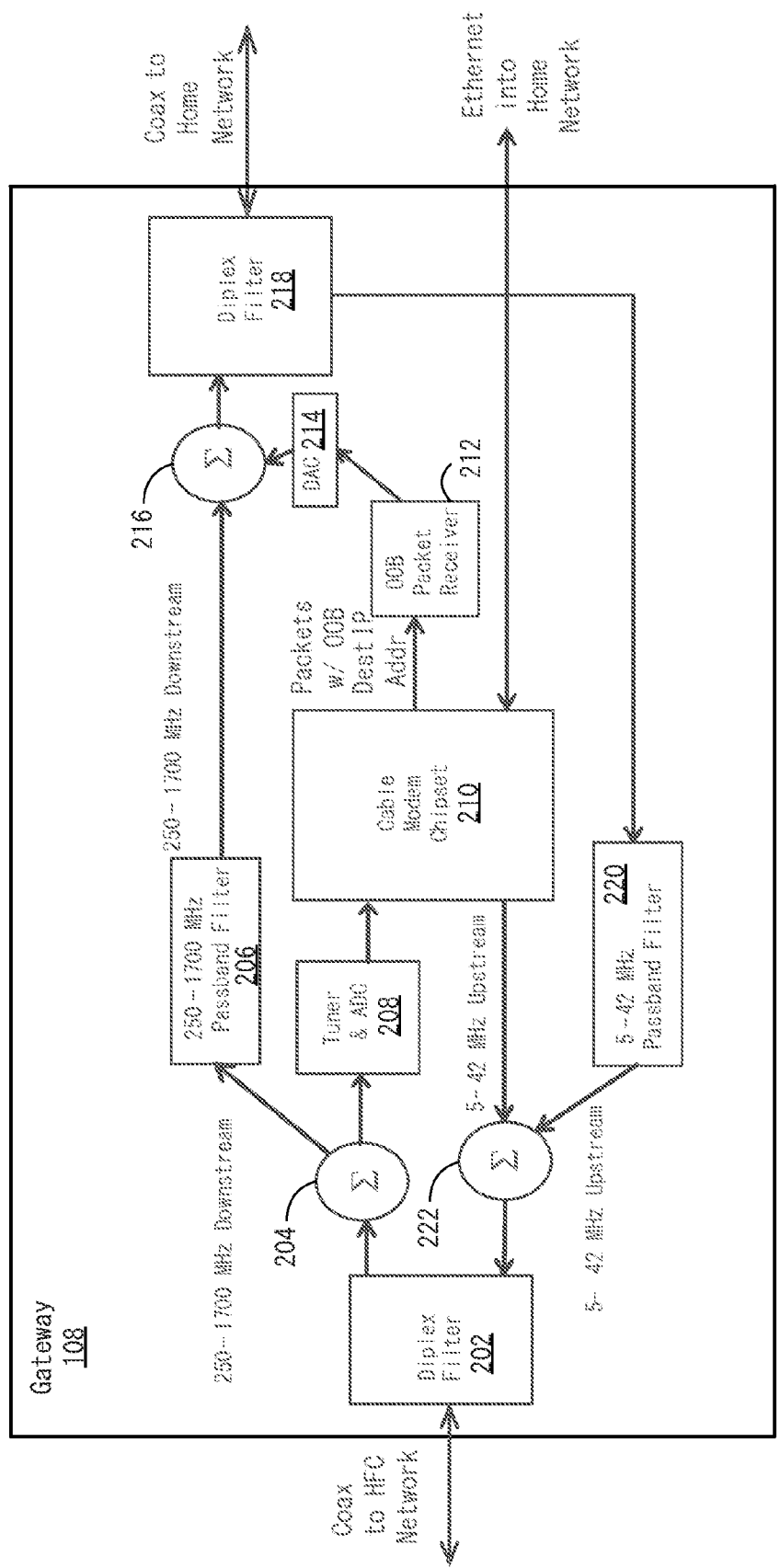
FIG. 2 depicts an example of a gateway for processing samples sent in a network downstream signal from a head-end according to one embodiment.

FIG. 2 depicts an example of gateway 108 for processing samples sent in a network downstream signal from head-end 114 according to one embodiment. Although this configuration of gateway 108 is discussed, it will be recognized that variations of gateway 108 may also be appreciated.

In head-end 114 (not shown), the out of band downstream signal may be an analog signal. The analog signal may be in the legacy OOB frequency range, such as between 70-130 MHz. Head-end 114 may generate digital samples of the analog signal using analog to digital conversion sampling techniques. The sampling may include different sampling techniques, such as broadband sampling or baseband sampling or I-Q quadrature sampling. Also, compression may be applied to the samples, such as using companding or other compression techniques. In one example, Broadband Compression Forwarding (BCF) may be used to compress and send the samples. Head-end 114 may then send the digital samples through HFC network 102 in a network downstream signal, such as via a DOCSIS channel. For example, a network downstream signal including the digital samples may be sent in Internet Protocol (IP) packets in the downstream frequency spectrum for HFC network 102. The downstream frequency band used is higher than the 70-130 MHz of the analog signal. For example, the network downstream signal is sent in the 250-1700 MHz downstream frequency band through HFC network 102.

In gateway 108, diplex filter 202 receives the network downstream signal from HFC network 102. Diplex filter 202 allows a forward signal path and a reverse signal path to use the same network, such as a coaxial cable, without interference. Further discussion of a diplex filter will not be described, but a person of skill in the art will appreciate how a diplex filter works. In the downstream direction, diplex filter 202 passes the network downstream signal to a splitter 204.

Splitter 204 can receive the network downstream signal and split it onto multiple paths within the gateway. In one embodiment, splitter 204 may send network downstream signals that are in the 250-1700 MHz frequency range to a passband filter 206, which may or may not be used to further filter the signals. These network downstream signals may include analog or digital signals for various video programming channels to be sent on coaxial cable in home network 104. Also, splitter 204 may send the network downstream signals including DOCSIS transmissions to a tuner and analog-to-digital converter (ADC) 208. The tuner/ADC 208 can receive the downstream signals and digitize some or all of the transmission for further processing within the cable modem chipset 210. For example, the tuner/ADC 208 may tune to certain frequencies in which the DOCSIS downstream signal is sent. The DOCSIS signal may be sent in a downstream channel at a certain frequency band within the 250-1700 MHz downstream frequency band. Tuner/ADC 208 may tune to that frequency channel and output the packets at baseband frequencies and convert the network downstream signal from analog to digital. The signal is then output to a cable modem chipset 210.

Cable modem chipset 210 can then process the network downstream signal to determine the destination for the network downstream signals. For example, the network downstream signal may have been delivered in various IP packets. IP packets that include an out of band destination IP address could be separated from packets that include a different destination IP address. The packets that are not out of band network downstream signals are sent to set top boxes 112 or other computing devices via a protocol, such as Ethernet.

The packets with a destination IP address for out of band downstream signals are sent to an out of band packet receiver 212. Out of band packet receiver 212 can then process the packets to determine the digital samples for the out of band downstream signal that were included in the packets. For example, the IP headers may be stripped off the IP packets to determine the digital samples. As discussed above, the analog out of band signal was already sampled in head-end 114 to create the samples.

For example, for option b), where digital samples (obtained via analog to digital conversion techniques) of the analog signals which are the broadband radio frequency (RF)-modulated and coded versions of the out of band downstream signals based on the legacy RF modulation protocols normally used to transmit the out of band signals directly to the set-top boxes in the 70-130 MHz range were transported, out of band packet receiver 212 may provide these samples to a digital-to-analog converter (DAC) 214 receives the digital samples and can convert them into an analog signal. For option c), where digital samples (obtained via analog to digital conversion techniques) of the baseband analog signals resulting from the frequency down conversion of the broadband RF-modulated and coded versions of the out of band downstream signals based on the legacy RF modulation protocols normally used to transmit the out of band signals directly to the set-top boxes in the 70-130 MHz range were transported, out of band packet receiver 212 may process the digital sample, such as by upconverting the samples from baseband, before providing the samples to DAC 214. For option d), where digital I and Q samples (obtained via analog to digital conversion techniques) of the baseband analytical signals resulting from the quadrature down conversion (using a complex-valued exponential) of the broadband RF-modulated and coded versions of the out of band downstream signals based on the legacy RF modulation protocols normally used to transmit the out of band signals directly to the set-top boxes in the 70-130 MHz range, out of band packet receiver 212 out of band packet receiver 212 may process the digital sample, such as by upconverting the samples from baseband, before providing the samples to DAC 214. Also, out of band packet receiver 212 may decompress the digital samples if compression was used.

To recreate the out of band downstream signal, a digital-to-analog converter (DAC) 214 receives the digital samples and can convert them into an analog signal. DAC 214 outputs a re-created analog out of band downstream signal at a frequency in the range of 70-130 MHz. A combiner 216 receives the re-created out of band downstream signal in addition to the 250-1700 MHz network downstream signals from passband filter 206. These signals are combined at combiner 216 and input into diplex filter 218. It should be noted that diplex filter 218 may separate upstream and downstream signals with a different split frequency than diplex filter 202. In this case, diplex filter 218 may output the combined out of band downstream and network downstream signals using frequencies within the 54-1700 MHz downstream spectrum in home network 104. In one embodiment, the frequency for the out of band downstream signal for home network 104 is within the upstream frequency band for the HFC network spectrum, such as within the 70-130 MHz range. However, the network downstream signal was sent through the HFC network at a higher frequency (>200 MHz) to allow the HFC network to be configured in a high frequency split configuration. Thus, the network downstream signal and the out of band downstream signal occupy different portions of the downstream frequency spectrum, so the two signals can then be combined by combiner 216 to create the final downstream signal that is to be sourced through the diplex filter 218 and then transmitted into the home network 104.

In the upstream direction, diplex filter 218 may receive upstream signals in the 5-42 MHz upstream frequency band for home network 104. Upstream signals in the frequency range 43-204 MHz are not used by set-top boxes 112 because these legacy set-top boxes do not communicate upstream in that frequency range. Diplex filter 218 separates the upstream and downstream signals and sends the upstream signal to a 5-42 MHz passband filter 220. Passband filter may or may not be used to filter signals that are above 42 MHz. Additionally, information to be sent upstream may be received via Ethernet at cable modem chipset 210, or chipset 210 may generate upstream information itself. This information may be sent from devices other than set-top boxes 112.

A combiner 222 receives the upstream signals in the 5-42 MHz spectrum from passband filter 220 and upstream signals from cable modem chipset 210, combines them, and provides them to diplex filter 202. Diplex filter 202 can then pass the upstream signals to head-end 114 through HFC network 102.

Figure 3:
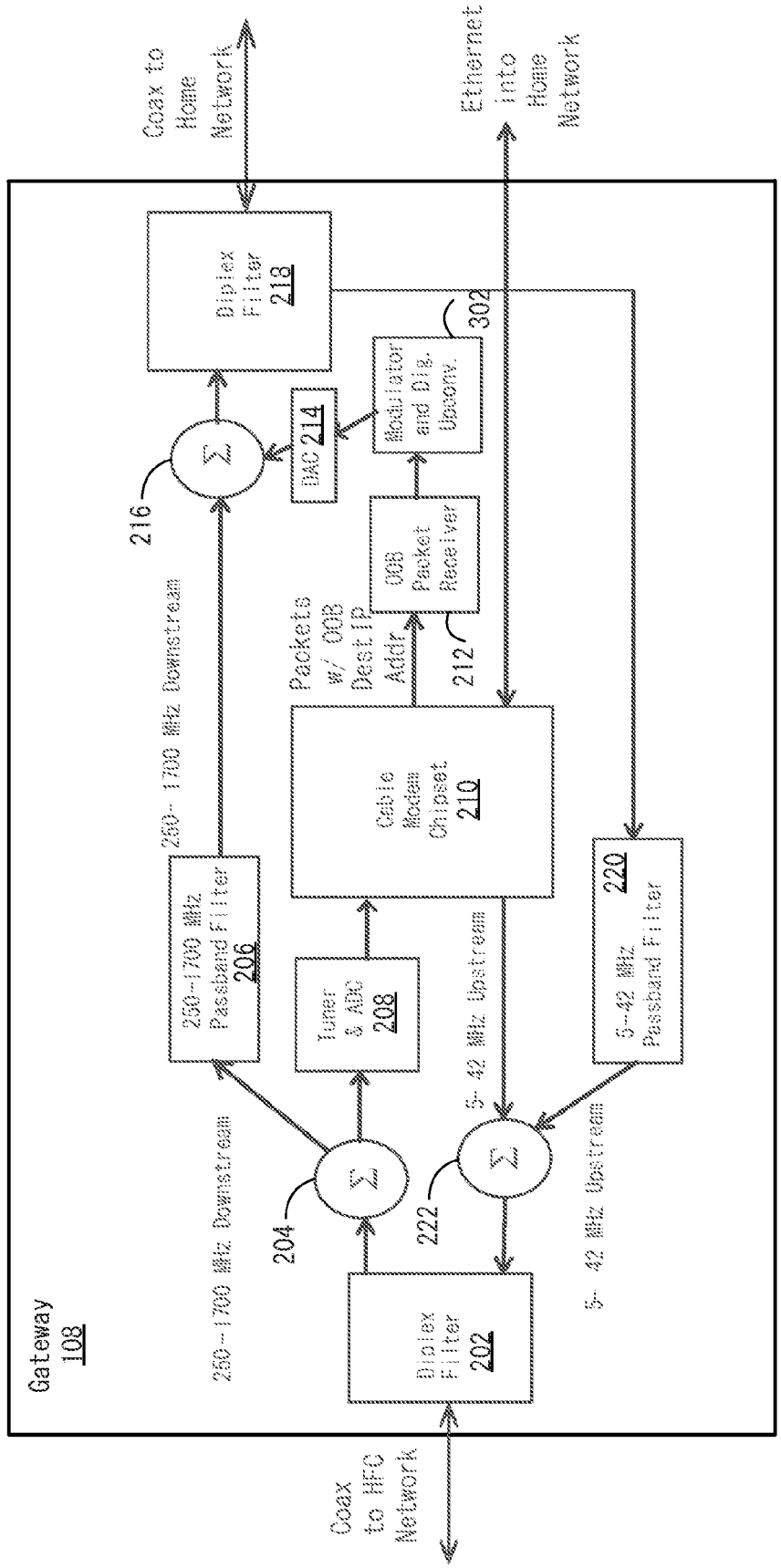
FIG. 3 depicts an example for sending raw digital data according to one embodiment.

FIG. 3 depicts an example for sending raw digital data according to one embodiment. Gateway 108 in this embodiment may be similar to the gateway described in FIG. 2. However, in this case, head-end 114 does not modulate and/or compress the analog out of band downstream signal to create digital samples that are then sent to gateway 108. Rather, raw digital data (e g, unmodulated) for the out of band downstream signal is sent in IP packets through HFC network 102 to gateway 108. Also, DOCSIS set-top box gateway (DSG) or intercommunication protocol definition language (IPDL) protocols may be used to transport the raw digital data over DOCSIS.

Diplex filter 202 receives the network downstream signal, which can then be processed in splitter 204, tuner and ADC 208, and cable modem chipset 210 similarly as discussed above. For packets with a destination address for out of band communications, cable modem chipset 210 sends the packets to OOB packet receiver 212. OOB packet receiver 212 receives the packets and can determine the raw digital data from the packets by removing the IP headers. This raw digital data needs to be modulated and upconverted from baseband before being sent to DAC 214.

To create the samples, a modulator and digital up converter 302 receives the digital data and can create digital samples from the raw digital data. For example, modulator 302 may modulate the raw digital data to create the samples. Also, digital up conversion from the baseband to the frequency range for the legacy STB OOB downstream channels is also performed. The digital samples are input into DAC 214, which can then convert the samples to the analog out of band downstream signal. The analog out of band downstream signal is then delivered to set-top boxes 112 as discussed above with respect to FIG. 2. The upstream portion of gateway 108 also works in the same manner as discussed above.

Figure 4:
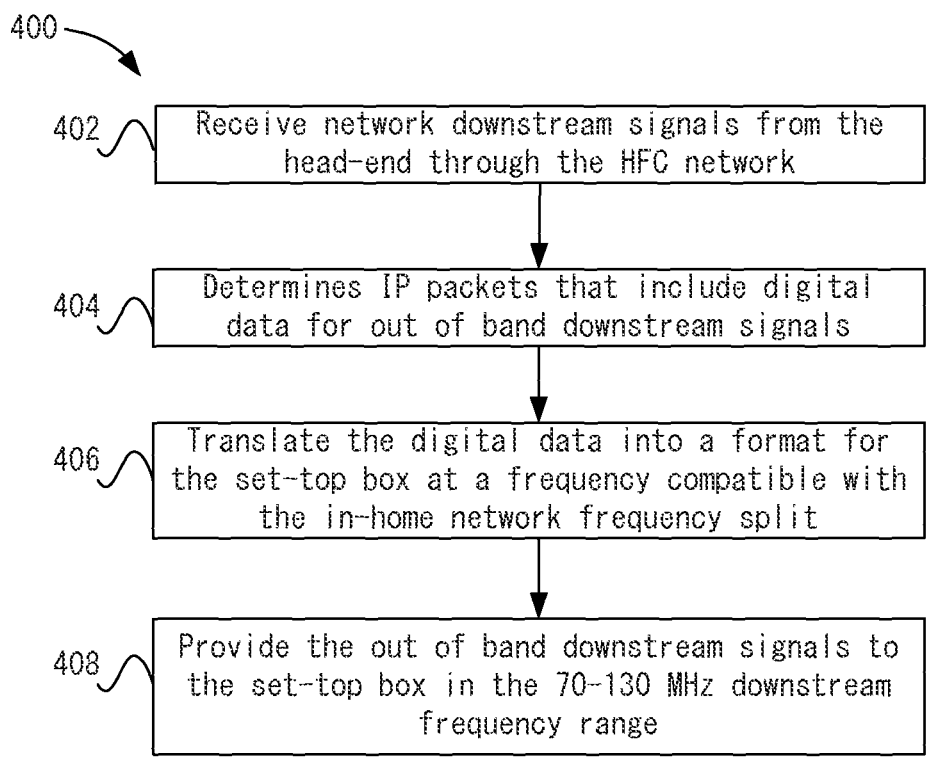
FIG. 4 depicts a simplified flowchart of a method for translating signals between different spectrums of different networks according to one embodiment.

FIG. 4 depicts a simplified flowchart 400 of a method for translating signals between different spectrums of different networks according to one embodiment. At 402, gateway 108 receives network downstream signals from head-end 114 through HFC network 102. At 404, gateway 108 determines IP packets that include digital data for out of band downstream signals. As discussed above, the digital data may be digital samples created at head-end 114 or raw digital data.

At 406, gateway 108 translates the digital data into a format for set-top box 112 at a frequency compatible with the in-home network frequency split. As discussed above, an out of band downstream signal may be created in the 70-130 MHz downstream frequency range. At 408, gateway 108 provides the out of band downstream signals to set-top box 112 in the 70-130 MHz downstream frequency range.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for translating signals between a first network operating at a first frequency split between a first upstream frequency band and a first downstream frequency band and a second network operating at a second frequency split between a second upstream frequency band and a second downstream frequency band, the method comprising:
receiving, by a computing device situated in between the first network and the second network, encapsulated raw digital data comprising an unmodulated and un-coded digital bitstream, said bitstream for an out of band (OOB) downstream communication channel, the said encapsulated raw digital data carried within the first downstream frequency band from the first network,
from said encapsulated raw digital data, said computing device extracting said unmodulated and uncoded digital bitstream,
from said unmodulated and un-coded digital bitstream, the computing device situated between the first network and second network creating an RF-modulated and coded version of the OOB downstream communication channel having a frequency within the second downstream frequency band, said creating comprising:
modulating said raw digital data to create digital samples for the OOB downstream communication channel;
converting the digital samples of said OOB downstream communication channel for sending at a second frequency in the second downstream frequency band using the second frequency split;
digital-to-analog converting said frequency-converted digital samples into an analog out of band downstream signal; and
sending, by the computing device, the analog OOB downstream signal to user equipment at a frequency in the second downstream frequency band, wherein the frequency in the second downstream frequency band at which the analog OOB downstream signal is sent is within the first upstream frequency band of the first network.

2. The method of claim 1, wherein determining the samples comprises:
modulating the digital data for the OOB downstream signal to create the samples for the OOB downstream signal.

3. The method of claim 2, wherein the digital data in the first downstream signal is raw digital data that is unmodulated and uncoded and represents the OOB downstream signal.

4. The method of claim 1, wherein the samples for the OOB downstream signal are included in the first downstream signal that is received from a head-end device in the first network.

5. The method of claim 4, wherein the first downstream signal comprises a plurality of packets that include the samples in a compressed or uncompressed form.

6. The method of claim 4, wherein the samples for the OOB downstream signal were sampled from an analog OOB downstream signal in a head-end device in the first network, wherein the analog signal was within the second downstream frequency band of the second network.

7. The method of claim 6, wherein the samples for the OOB downstream signal were sampled from the analog OOB downstream signal that is radio frequency modulated and coded using a protocol for sending the OOB downstream signal in the second downstream frequency band.

8. The method of claim 6, wherein the samples for the OOB downstream signal were sampled from a version of the analog OOB downstream signal that is downconverted from the analog OOB downstream signal that is radio frequency modulated and coded using a protocol for sending the OOB downstream signal in the second downstream frequency band.

9. The method of claim 7, wherein the samples for the OOB downstream signal are I and Q samples obtained from the analog OOB downstream signal that is downconverted from the analog OOB downstream signal that is radio frequency modulated and coded using a protocol for sending the OOB downstream signal in the second downstream frequency band.

10. The method of claim 1, wherein converting comprises:
converting the samples using a digital to analog converter (DAC) to create an analog OOB downstream signal.

11. The method of claim 1, wherein:
the first upstream frequency band comprises a 5-204 MHz range and the first downstream frequency band comprises a 250-1700 MHz range, and
the second upstream frequency band comprises a 5-42 MHz range and the second downstream frequency band comprises a 54-1700 MHz range.

12. An apparatus configured for translating signals between a first network operating at a first frequency split between a first upstream frequency band and a first downstream frequency band and a second network operating at a second frequency split between a second upstream frequency band and a second downstream frequency band, the apparatus comprising:
receiver circuitry configured for receiving, in between the first network and the second network, encapsulated raw digital data comprising an unmodulated and un-coded digital bitstream, said bitstream for an out of band (OOB) downstream communication channel, the said encapsulated raw digital data carried within the first downstream frequency band from the first network;
circuitry for extracting an unmodulated and uncoded digital bitstream from said encapsulated raw digital data, and from said unmodulated and uncoded digital bitstream creating an RF-modulated and coded version of the OOB downstream communication channel having a frequency within the second downstream frequency band, said circuitry comprising:
OOB processing circuitry configured for modulating said raw digital data create digital samples for the OOB downstream communication channel;
converter circuitry for converting the digital samples of said OOB downstream communication channel for sending at a second frequency in the second downstream frequency band using the second frequency split; and
digital-to-analog circuitry for converting said frequency-converted digital samples into an analog out of band downstream signal; and
transmission circuitry for sending the analog OOB downstream signal to user equipment at a frequency in the second downstream frequency band, wherein the frequency in the second downstream frequency band at which the analog OOB downstream signal is sent is within the first upstream frequency band of the first network.

13. The apparatus of claim 12, wherein the receiver circuitry comprises a tuner configured to tune to a frequency to receive the first downstream signal.

14. The apparatus of claim 13, wherein the receiver circuitry comprises an analog to digital converter configured to convert the first downstream signal from an analog signal to a digital signal.

15. The apparatus of claim 14, wherein the receiver circuitry comprises a cable modem circuit configured for separating packets for the first downstream signal from other downstream signals.

16. The apparatus of claim 12, further comprising:
a modulator for modulating the digital data for the OOB downstream signal to create digital samples of the analog OOB downstream signal.

17. The apparatus of claim 12, wherein the converter circuitry comprises a digital to analog converter for converting the samples for the OOB downstream signal to an analog OOB downstream signal.

* * * * *